United States Patent
Cook et al.

(10) Patent No.: US 11,262,724 B2
(45) Date of Patent: Mar. 1, 2022

(54) PNEUMATIC MANIFOLD-BASED FLEXIBLE TOOLING SYSTEM

(71) Applicant: CNA MANUFACTURING SYSTEMS, INC., Renton, WA (US)

(72) Inventors: Larry Ray Cook, Anacortes, WA (US); Justin Somers Stamen, Seattle, WA (US); Brian Lee Miller, Stanwood, WA (US); Steven Heath Mason, Monroe, WA (US); Kenneth O'Neil Kelly, Graham, WA (US)

(73) Assignee: CNA MANUFACTURING SYSTEMS, INC., Renton, WA (US)

( * ) Notice: Subject to any disclaimer, the term of this patent is extended or adjusted under 35 U.S.C. 154(b) by 0 days.

(21) Appl. No.: 17/334,476

(22) Filed: May 28, 2021

(65) Prior Publication Data

US 2021/0286336 A1    Sep. 16, 2021

Related U.S. Application Data

(63) Continuation of application No. 16/866,374, filed on May 4, 2020, now Pat. No. 11,022,953.
(Continued)

(51) Int. Cl.
*G05B 19/402* (2006.01)
*B23Q 1/03* (2006.01)

(52) U.S. Cl.
CPC ........... *G05B 19/402* (2013.01); *B23Q 1/035* (2013.01); *G05B 2219/33098* (2013.01); *G05B 2219/45207* (2013.01)

(58) Field of Classification Search
CPC .......... B23Q 1/03; B23Q 1/032; B23Q 1/035; B23Q 1/037; B23Q 16/001; B23Q 16/023;
(Continued)

(56) References Cited

U.S. PATENT DOCUMENTS

| | | | |
|---|---|---|---|
| 2,471,921 | A | 5/1949 | Ashdown |
| 3,542,354 | A | 11/1970 | Fitzpatrick |

(Continued)

FOREIGN PATENT DOCUMENTS

| | | |
|---|---|---|
| WO | 99/06917 | 2/1999 |
| WO | 2005042204 | 12/2005 |

OTHER PUBLICATIONS

Retrieved from https://www.aerospacemanufacturinganddesign.com/product/kostyrka-uhf-chucking-device-38291/ (retrieved May 20, 2020). Publication date—Jul. 17, 2014.
(Continued)

*Primary Examiner* — Joseph J Hail
*Assistant Examiner* — Timothy Brady
(74) *Attorney, Agent, or Firm* — Leonid Kisselev

(57) ABSTRACT

The low profile of the flexible tooling system disclosed allows for flexible tooling to be added to nearly all CNC machines with an accommodating z-axis height and allows easier relocation of the system from one CNC machine to another. The system includes one or more pods, each of the pods of the system replacing the function of four independent actuators of earlier systems but operating with a shared mechanical frame. Arranging the mechanism into groups of four allows for greater density of part support spacing, minimizes cable requirements, and allows for air, vacuum, and vacuum sensor requirements be localized on each pod. The pods allow for part supports to be spaced as close as 6" in the x and y axis. An increased variable position assembly density allows for greater flexibility to hold complicated parts.

20 Claims, 14 Drawing Sheets

Related U.S. Application Data

(60) Provisional application No. 62/844,682, filed on May 7, 2019.

(58) Field of Classification Search
CPC . B23Q 3/00; B23Q 3/06; B23Q 3/062; B23Q 3/08; B23Q 3/088; B23Q 7/14; G05B 19/19; G05B 19/402; G05B 2219/33098; G05B 2219/45207; B25B 11/005; B25B 11/007; B25B 1/2421; B25B 1/2415; B25B 1/20
USPC .................................................. 269/37, 266
See application file for complete search history.

(56) References Cited

U.S. PATENT DOCUMENTS

| | | | |
|---|---|---|---|
| 3,599,279 A * | 8/1971 | McDonald | B29C 45/681 425/590 |
| 3,853,313 A | 12/1974 | Appenzeller et al. | |
| 3,926,447 A | 12/1975 | Cox, Jr. | |
| 4,080,716 A | 3/1978 | Vom Dorp | |
| 4,088,312 A | 5/1978 | Frosch et al. | |
| 4,200,272 A | 4/1980 | Godding | |
| 4,317,577 A | 3/1982 | Cameron | |
| 4,432,559 A | 2/1984 | Rasmussen | |
| 4,491,306 A | 1/1985 | Eickhorst | |
| 4,527,783 A | 7/1985 | Collora et al. | |
| 4,638,984 A | 1/1987 | Puisais et al. | |
| 4,684,113 A * | 8/1987 | Douglas | B23Q 1/035 269/21 |
| 4,693,458 A | 9/1987 | Lewecke et al. | |
| 4,736,957 A | 4/1988 | Bischopink | |
| 4,883,312 A * | 11/1989 | Kulis | B23Q 16/00 296/214 |
| 4,946,149 A * | 8/1990 | Greene | B23Q 16/001 269/21 |
| 5,110,239 A | 5/1992 | Riley et al. | |
| 5,139,245 A | 8/1992 | Bruns et al. | |
| 5,143,360 A | 9/1992 | Wilken et al. | |
| 5,163,793 A * | 11/1992 | Martinez | B21J 15/10 269/309 |
| 5,230,594 A | 7/1993 | Pilkington | |
| 5,279,493 A | 1/1994 | Halder | |
| 5,316,276 A | 5/1994 | Heinle | |
| 5,318,005 A | 6/1994 | Mayer | |
| 5,364,083 A | 11/1994 | Ross et al. | |
| 5,372,357 A | 12/1994 | Blaimschein | |
| 5,427,363 A * | 6/1995 | Rink | B23B 31/307 269/21 |
| 5,457,868 A | 10/1995 | Blaimschein | |
| 5,546,784 A | 8/1996 | Haas et al. | |
| 5,551,677 A | 9/1996 | Puettmer et al. | |
| 5,562,276 A | 10/1996 | Blick | |
| 5,722,646 A * | 3/1998 | Soderberg | B23Q 1/035 269/20 |
| 5,846,464 A * | 12/1998 | Hoffman | G05B 19/40938 264/219 |
| 6,024,392 A * | 2/2000 | Blatt | B25B 11/007 294/185 |
| 6,032,348 A | 3/2000 | Haas et al. | |
| 6,209,188 B1 | 4/2001 | Soderberg et al. | |
| 6,250,619 B1 * | 6/2001 | Cook | B23Q 1/035 269/20 |
| 8,322,700 B2 | 12/2012 | Saberton et al. | |
| 8,469,345 B2 | 6/2013 | Samac et al. | |
| 10,562,157 B2 * | 2/2020 | Rinaldi | B23Q 1/035 |
| 2006/0017298 A1 * | 1/2006 | Osten | B25J 15/0052 294/65 |
| 2007/0069436 A1 * | 3/2007 | Zarske | B25B 11/005 269/1 |
| 2009/0057971 A1 * | 3/2009 | Bumgarner | B23Q 1/035 269/21 |
| 2011/0018185 A1 * | 1/2011 | Samac | B23Q 3/06 269/90 |
| 2011/0037213 A1 * | 2/2011 | Marrinan | B23Q 1/035 269/315 |
| 2014/0199153 A1 * | 7/2014 | Reinhold | B65H 3/0816 414/800 |
| 2016/0152507 A1 * | 6/2016 | Brown | C03B 33/033 65/53 |
| 2018/0215540 A1 * | 8/2018 | Tanaka | B25J 19/0004 |
| 2019/0210217 A1 | 7/2019 | Bolton et al. | |

OTHER PUBLICATIONS http://infinitetool.com/turnkey-automated-systems-portfolio/flexible-tooling-system/ . Cached on Aug. 18, 2018.
https://dk8mx37zdr9bp.cloudfront.net/metal-cutting-composites/PDF_Fives_Line_Machines/Liné%20Machines%20FLEXITOOL%20-Light.pdf . Copyright 2014.
https://www.mtorres.es/en/aeronautics/products/metallic/torrestool. Cached on Jan. 8, 2019.
https://ph.parker.com/us/en/lcb-series-lcb040-belt-driven-slider-bearing-rodless-linear-actuator . Cached on Aug. 23, 2017.
Centralized Flexible Manufacturing Center. Original publication date unavailable. Saved as of Sep. 8, 2015.
CNA Manufacturing Systems, POGO Actuator. Original publication date unavailable. Saved as of Aug. 21, 2014.
https://www.parker.com/Literature/Electromechanical%20North%20America/SERVICE-USER%20GUIDES/ETH%20Manual%20192-550002N2.pdf, revised Nov. 21, 2018.
ETP Hydro-Grip brochure, cashed on Mar. 12, 2016.
Merriam-Webster Dictionary (Year: 2020).
https://www.mmsonline.com/articles/abrasive-waterjet-helps-make-composites--affordable-for-boeing. Aug. 5, 2008.

* cited by examiner

100

2

Fig. 7A
Fig. 7B
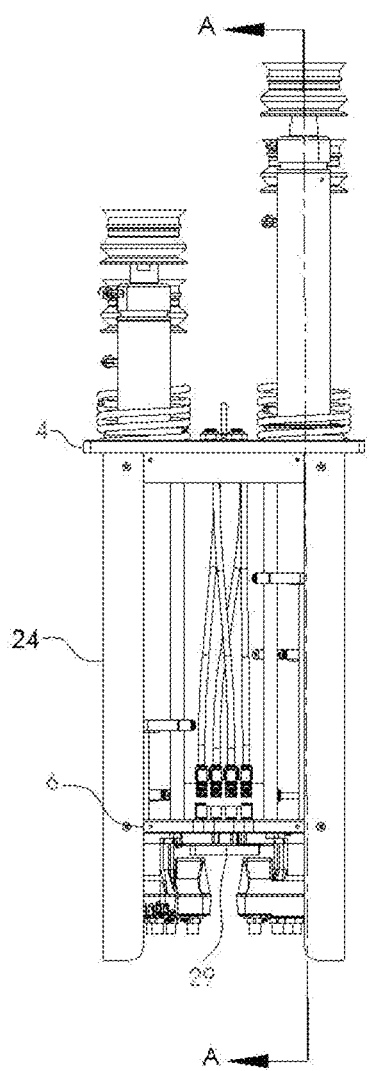
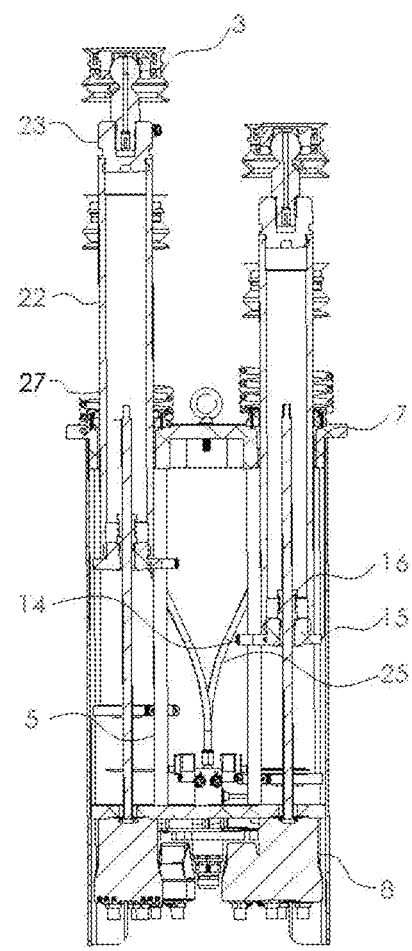
SECTION A-A

8

Fig. 10A
Fig. 10B
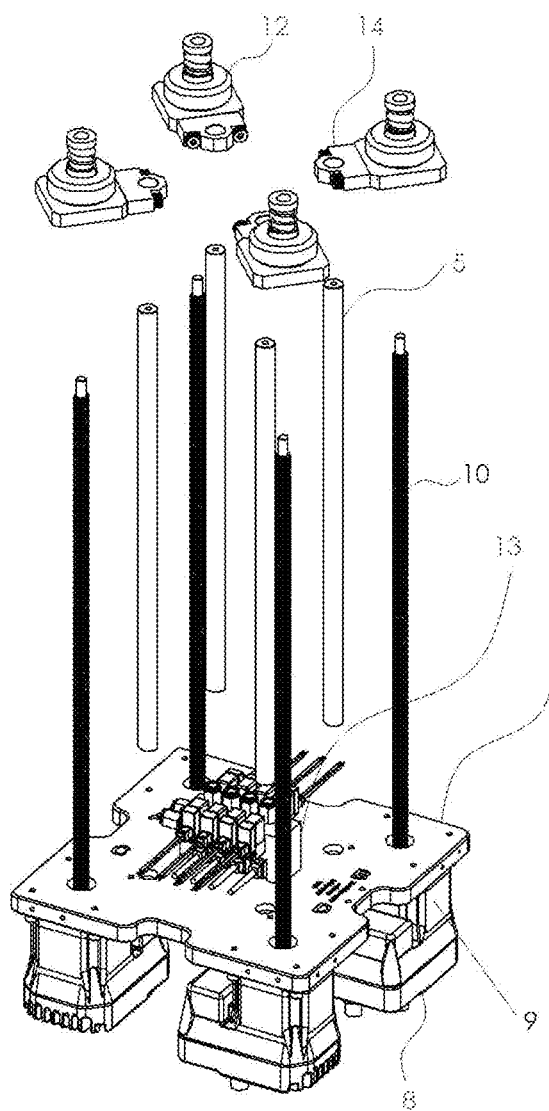
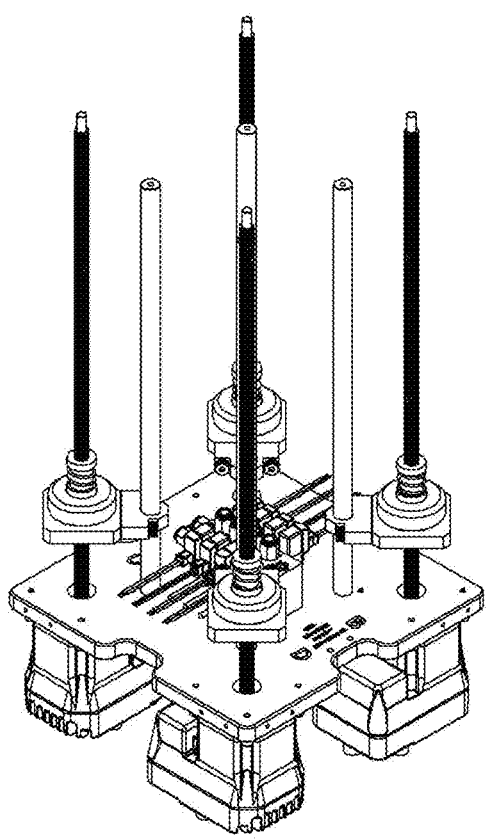

Fig. 11A
12
Fig. 11B
12
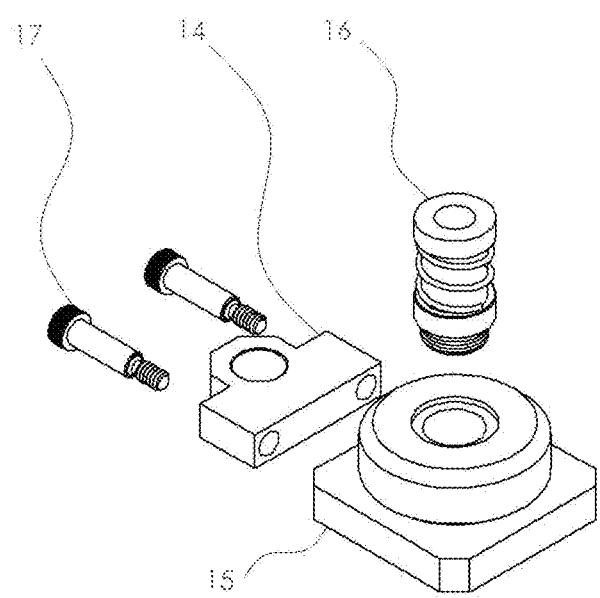
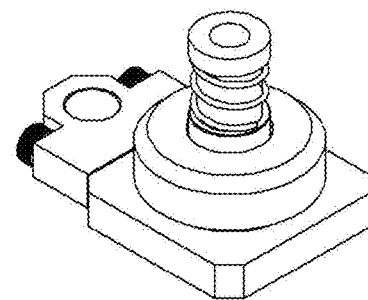

SECTION A-A

SECTION A-A

PNEUMATIC MANIFOLD-BASED FLEXIBLE TOOLING SYSTEM

CROSS-REFERENCE TO RELATED APPLICATION

This non-provisional patent application is a continuation of U.S. Pat. No. 11,022,953, issued Jun. 1, 2021, which claims priority under 35 U.S.C. § 119(e) to U.S. Provisional Patent application, Ser. No. 62/844,682, filed May 7, 2019, the disclosure of which is incorporated by reference.

FIELD

The present invention relates in general to manufacturing, and in particular, to a pneumatic manifold-based flexible tooling system.

BACKGROUND

Computer numerical control (CNC) machines are used in many industries, including aerospace manufacturing, and often require specialized tooling to hold the parts being manufactured. Due to the complexity of requiring part specific tooling for large numbers of parts, flexible tooling systems, which can be configured to hold multiple different parts for manufacture, were created. These flexible tooling systems typically consist of a combination of structure and mechanism that enable the positioning of multiple individual tooling elements such as hard stops or vacuum fixtures at known positions in space that are derived from the shape of the part needed to be held by the flexible tooling system.

Typical installed systems use a set of individual driven actuators, each one positioning one of these individual tooling elements, to form a larger flexible tooling system. They are used to rigidly hold contoured or flat panels made of metal or composites for a variety of manufacturing operations (i.e. trimming, drilling, waterjet cutting, inspection, laser scribing, and assembly). These systems are computer controlled, and use specialized software programs that control the operations of the system components.

Existing flexible tooling systems generally have multiple design features that limit their usefulness during the CNC machining that may render them unusable during particular projects:

High system costs, often more expensive than the machine tools they are paired with.

Minimum tooling system size. In particular minimum tooling system height (which is often along the Z axis of travel of machine tools). This determines a minimum usable z-axis height of a machine tool with an installed flexible tooling system. Insufficient Z stroke may require foundation work to put a sufficiently deep pit into the floor of the machining cell to be able to use the system in the range of z-travel desired for machining.

Being unable to provide sufficient support under their parts which require a closer pattern of actuators. Parts held by flexible tools of this type deform under their own weight and when undergoing machining forces, and the larger the spacing between supports, the more potential deformation exists. This deformation countered by the specific stiffness of the part in the region being supported and machined, making spacing needs very part dependent.

Despite these challenges, a number of flexible tooling systems have been created, installed, and used in the manufacture of parts. In practice, many parts that could benefit from flexible tooling for machining have less than a 12" contour to them, while a significant number of CNC machines have a 48" z-axis height.

One prior art flexible tooling system, manufactured by CNA Manufacturing Systems, Inc. of Renton, Wash. ("CNA"), is shown with reference to FIG. 2. FIG. 2 is a functional diagram of the prior art flexible tooling system showing the relationship between End Effectors, Table, Individual End Effector positioning actuators, and the controls not mounted on the table. The system was designed to fixture large curved parts by programmed fixture locations instead of hard fixed tooling, included large tooling tables with a mounted grid of servo motor driven linear actuators (hundreds of actuators) directly mounted on a table. This application required high positional accuracy (~0.001") and required motors and hardware that could deliver this accuracy. A separate system of valves controlled the air and vacuum needed for the individual tooling elements attached at the end of each actuator (called End Effectors by CNA). This initial system was very expensive, and required extensive labor to install. At the time (circa September 1995), typical servo motors required two cables, one for power and one for control, and a separate servo drive for each motor that was mounted in a control cabinet near but not in the table. This system then had a central computer system which read saved information derived from each part and commanded the drives and valves as needed for the operation of the tooling.

The linear actuators described above are self contained assemblies that generate motion along a linear translational path relative to the frame of the linear actuator assembly. The specific actuator embodiment described above consists of a servo motor connected to a screw drive which moves a rod guided by the frame. The rod and frame each have mounting hardware designed to let the rod be axially loaded. Such actuators are available as commercial products, and are often used as replacements for pneumatic cylinders.

CNA developed a second generation flexible tooling system, shown with reference to FIG. 3 and sold commercially as the V, VS, and VSS series POGO® actuators. FIG. 3 is, by way of example, a functional diagram of a further prior art flexible tooling system showing the relationship between the End Effectors, Table, Individual End Effector positioning actuators, and the controls not mounted on the table. The system included large tooling tables with a grid of air over oil linear actuators each with an integral sensor to measure positioning, and a hydraulic clamp to hold position. The system is further described in U.S. Pat. No. 6,209,188B1, issued Apr. 3, 2001, the disclosure of which is incorporated by reference. In contrast to the system shown with reference to FIG. 2, the second generation system removes the need for servo drives, and moves the air and vacuum valves from outside the table onto each actuator. Each actuator was controlled by that actuator's own onboard controller board that accepted commands over a network from a single computer running control software. This system had a significantly lower commissioning cost compared to the first generation design, one electrical cable per actuator, and no external servo drives. The onboard controller also permitted integrating air and vacuum regulation for use in End Effectors that holds the part being machined to the actuator.

This second generation system, while functional, did have a number of drawbacks: the individual actuators still had a large minimum height, limiting the practicality of mounting them under many machine tools. They also had a limited minimum space between actuators, limiting the support able to be provided to the parts held. The actuation and clamping system was sensitive enough to thermal variations some climate control was required, and some facilities preferred not to have any hydraulic components installed in any manufacturing system installed at their location.

Accordingly, there is a need for a flexible tooling system that can address these challenges.

SUMMARY

The low profile of the flexible tooling system disclosed below allows for flexible tooling to be added to nearly all CNC machines with an accommodating z-axis height—without major retrofits to the CNC machine, or lowering the flexible tool into a pit—which is the typical arrangement for current flexible tooling systems. Because of the low profile height of the flexible tooling system, the system can be moved from one CNC machine to another. The system includes one or more pods. Each of the pods of the system include four variable position assemblies that replicate the function of four actuators used in earlier systems built in a single pod structure, and sharing some common structure and components. Each pod functions as a multi-point variable positioning system, capable of moving and holding in place 4 tooling end effectors, and each pod then being mounted to a larger tooling table as part of an installed flexible tooling system.

Arranging the variable position assemblies into groups of four allows for greater density of individual tooling elements compared to spacing needed to install similar performance individual actuators used in prior systems, reduces cable requirements, maintains the network architecture that lets a central control system command large numbers of point positioning systems to operate the flexible tool system, and allows for air, vacuum, and vacuum sensor requirements for the contained variable position assemblies to be localized in each pod. The pod design allows for variable position assemblies to be spaced as close as 6" in the x and y axis with the current components (with the possibility of even closer spacing using off the shelf components that reduce the rated axial load rating which can be applied to the individual tooling elements), which allows for greater density of support beneath thin parts. An increased variable position assembly density allows for greater flexibility to hold complicated parts by having tooling elements in more places than would otherwise be possible in prior systems where actuator spacing density is limited to 8" or more.

In one embodiment, a pneumatic manifold-based flexible tooling system is provided. The system includes one or more pods attached to a table frame. Each of the pods includes: a top plate shaped to attach to the table frame, the top plate including one or more pass through shaft guides; a lower plate; a plurality of structural elements connecting the top plate to the lower plate; and one or more integrated motor and screw modules connected to the lower plate, each including: a motor co-axial with one of the pass through shaft guides; an encoder configured to detect the motor being in one of a plurality of positions; a motor controller configured to command the motor to take one of the positions using feedback from the encoder; a drive screw mechanically coupled to an output of the motor, wherein the drive screw is moved upon the motor moving from one of the positions to another one of the positions; an anti-rotation linear guide including a nut element that mounts onto the drive screw and a linear guide element that is attached to the nut element and that prevents rotation of the nut element, wherein the movement of the drive screw causes a linear motion of the nut element along a length of the drive screw; and a hollow shaft mounted onto the nut element, the hollow shaft extending through one of the pass through shaft guides and configured to connect to a tooling element including an end effector configured to hold a load. Each pod further includes a pneumatic manifold which provides air and vacuum to the end effectors, wherein the vacuum is used to secure the load to the end effectors, and the air is used to release the load from the end effectors. The pneumatic manifold further includes: a manifold block; air fittings connecting the manifold block to a supply of the air and a supply of the vacuum; and a plurality of pairs of valves attached to the manifold block, wherein flow of the vacuum or the air through a plurality of exit pneumatic ports of the manifold block is controlled by the pairs of the valves.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIGS. 7A-7B shows cross-sectional views of the pod of FIG. 1 in accordance with one embodiment

FIGS. 10A-10B shows the motor and the screw module of FIG. 6 in combination with certain other components of the pod in accordance with one embodiment.

FIGS. 11A-11B show the anti-backlash nut assembly of FIG. 10A-10B when disassembled and assembled in accordance with one embodiment.

DETAILED DESCRIPTION

Figure 1:
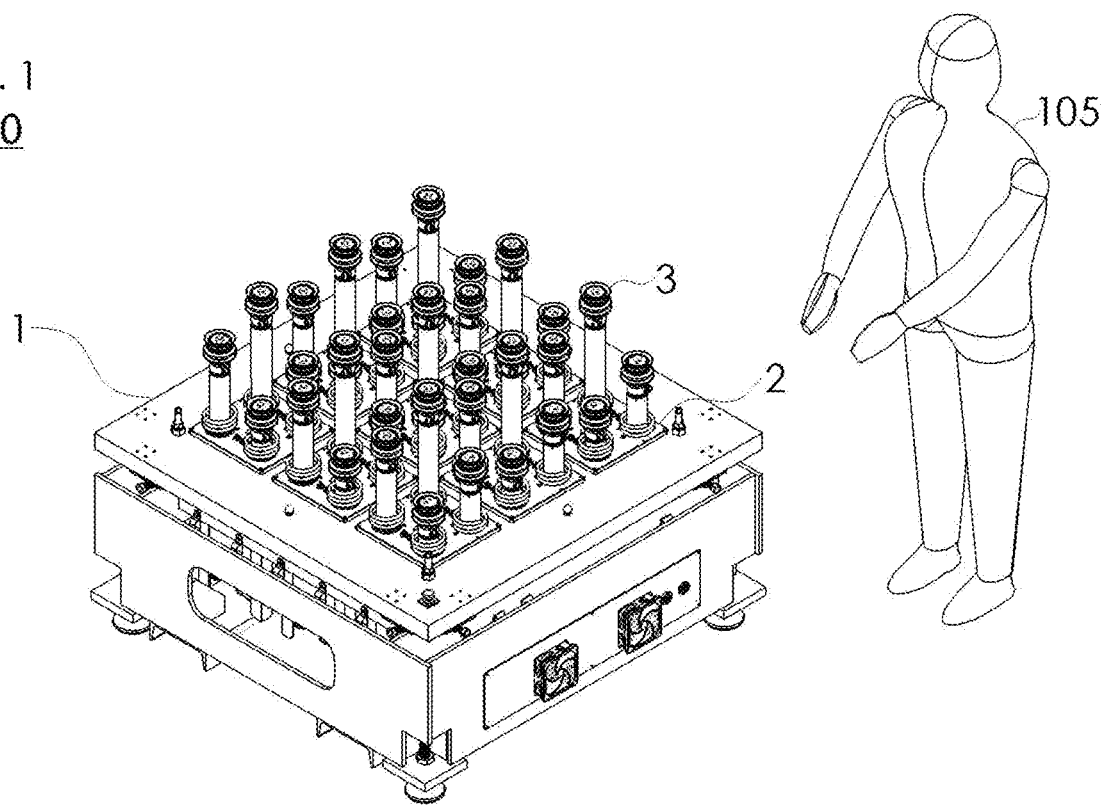
FIG. 1 is a diagram showing a flexible tooling system in accordance with one embodiment.
Figure 2:
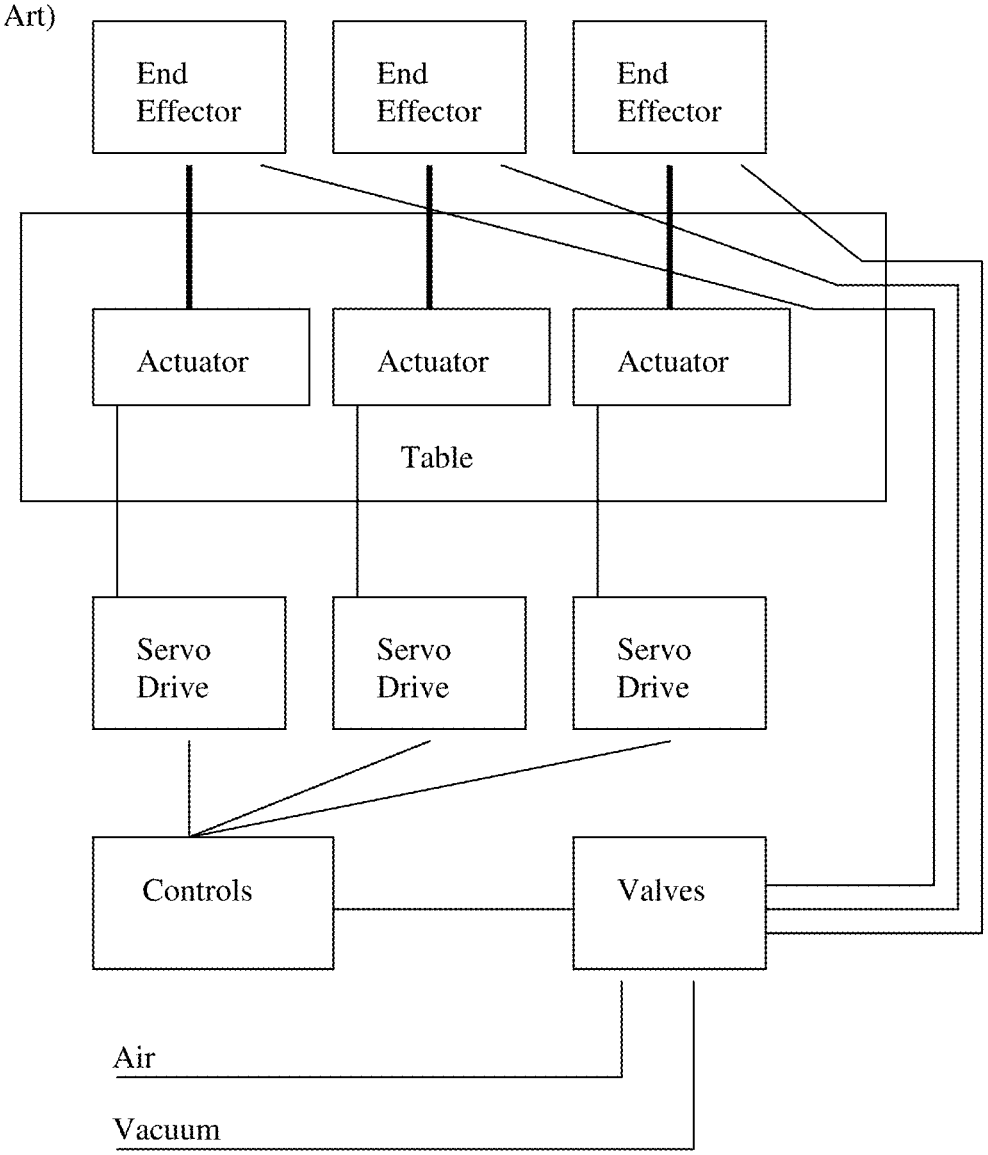
FIG. 2 is, by way of example, a functional diagram of the prior art flexible tooling system showing the relationship between End Effectors, Table, Individual End Effector positioning actuators, and the controls not mounted on the table.

FIG. 1 is a diagram showing a flexible tooling system 100 in accordance with one embodiment. A human user 105 is shown next to the system 100 for scale. The flexible tooling system includes a table frame 1 that includes one or more frameworks ("pods" from hereinafter) 2. The flexible tooling system can be customized to any size—from one pod 2, to any number of pods 2 in multiple combined table frames 1 constituting a single flexible tooling system 100.

Each pod 2 includes a plurality of connections to hold individual tooling elements 3, and the moving shaft structure, actuation mechanisms, supporting structure, and supporting electronics required to position those tooling elements 3 in space. While in the description below, the tooling elements 3 are referred to as "end effectors," the end effectors are particular kinds of tooling elements 3 and other kinds of tooling elements are possible, such as tooling balls, locating pins, or custom tooling surfaces held in space by a combination of three positioned shafts. Each pod 2 has its own control board, and valving that can individually control air 102 and vacuum 103 feeds for each end effector connected to the pod 2. Power, communication, air, and vacuum are routed inside the table frame 1 to each individual pod 2. Air and vacuum are provided from a central manifold location. Power and controls come from a centrally located human-machine interface ("HMI") with a system controller, such as a PC computer, though other kinds of controllers or computing devices are possible. The controller is in turn interfaced to a source of power, such as but not limited to a generator, a stored power source (such as a battery), or an electrical outlet. Each end effector's 3 location is individually controlled from the HMI through a communication network run over the cables connecting it to the pods 2, which allows for each end effector to be set to individual heights by positioning the moving shaft the end effector 3 is attached to (within the limit of the stroke of the mechanism) to be able to conform to the shape of the part being held by the flexible tooling system 100. When the flexible tooling system 100 has conformed to the shape of a part that needs to be held in place, and the part has been placed onto the flexible tooling system 100, the part is held in place in contact with the end effectors 3 using vacuum force that is controlled individually for each end effector 3 employed in the pattern for the part. Once the machining process of the part has been completed, vacuum supply 103 for each of the end effectors 3 is turned off and air supply 102 for each is turned on so as to break the vacuum force holding the part and to allow the part to be removed from the flexible tooling system 100. In one embodiment, a separate power cable and a separate network communication cable (via which control commands are provided and data is received) originate from the HMI and connect to the table 1. At the table 1, the power and network signals are routed such that they are united together into separate conductors in a single cable for each pod 2. The united cable connects to the pod 2 where the cable splits up into separate power and communication cables for each motor module 8 in the pod 2. The power and communication signals are common to each motor module 8 in the table 1. Motor modules 8 use an internal network address system to determine if the module 8 is the recipient of any given command. Other configurations of the cables are possible. Data from the motor module 8 (such as pressure level at end effector 3) can be provided to the HMI via the same cable provides communication to that motor module 8. The power and communication cables could connect ports 11 on the module 8, though other ways to connect the cables are possible."

Due to each motor module 8 being individually addressable by the HMI, the HMI can cause a movement of each of the motors 9 (and consequently coaxial tooling elements, such as an end effector 3) that is independent of other motors 9 but that can be concurrent with movement of other motors 9 ("asynchronous independent movement).

Figure 3:
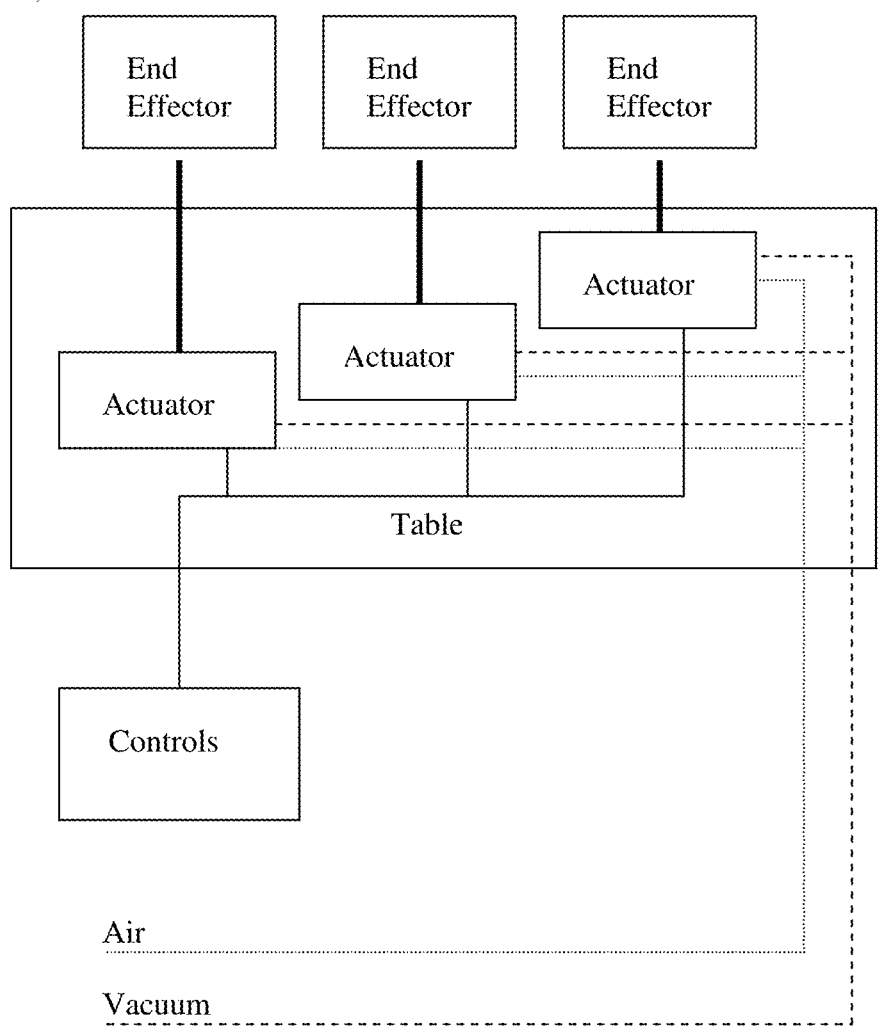
FIG. 3 is, by way of example, a functional diagram of a further prior art flexible tooling system showing the relationship between the End Effectors, Table, Individual End Effector positioning actuators, and the controls not mounted on the table.
Figure 4:
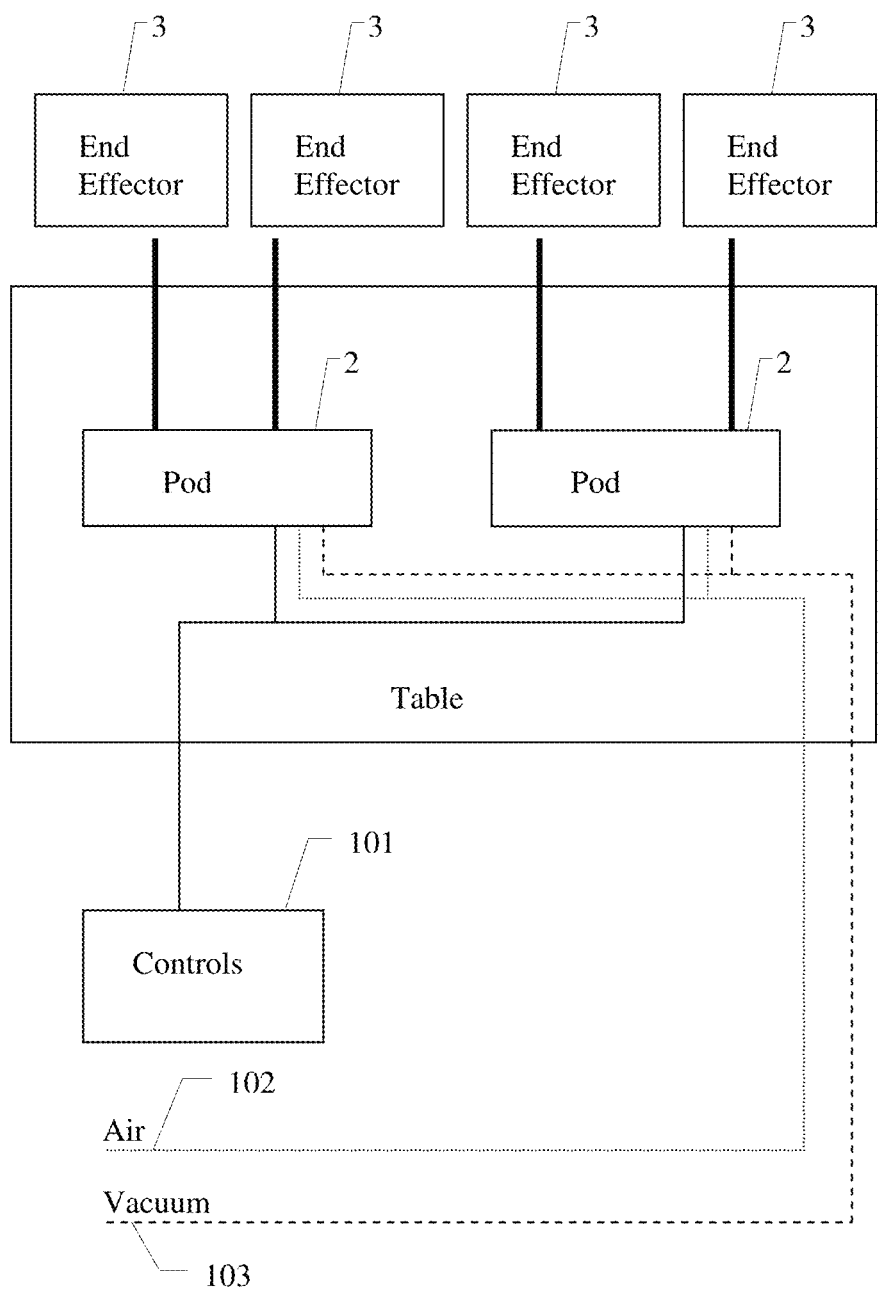
FIG. 4 is a functional diagram of the flexible tooling system of FIG. 1 showing the relationship between the end effectors, table, multiple end effector positioning pods, and the controls not mounted on the table in accordance with one embodiment.
Figure 5:
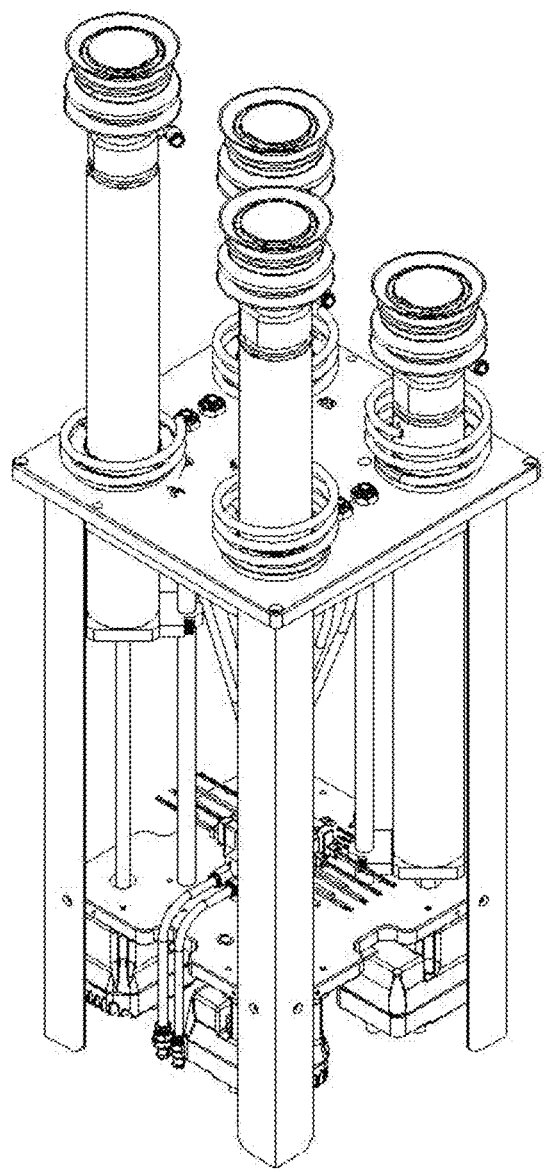
FIG. 5 is a diagram showing a perspective view of a pod of FIG. 1 in accordance with one embodiment.

FIG. 4 is a functional diagram of the flexible tooling system 100 of FIG. 1 showing the relationship between the end effectors 3, table 1, pods 2, and the controls 101 not mounted on the table in accordance with one embodiment. In contrast to the system shown in FIG. 3, each end effector 3 is no longer moved by a mechanically independent actuator, and wiring and plumbing connect to each pod from the controls 101 instead of to individual actuators. FIG. 5 is a diagram showing a perspective view of an assembled pod 2 of FIG. 1 in accordance with one embodiment.

Figure 6:
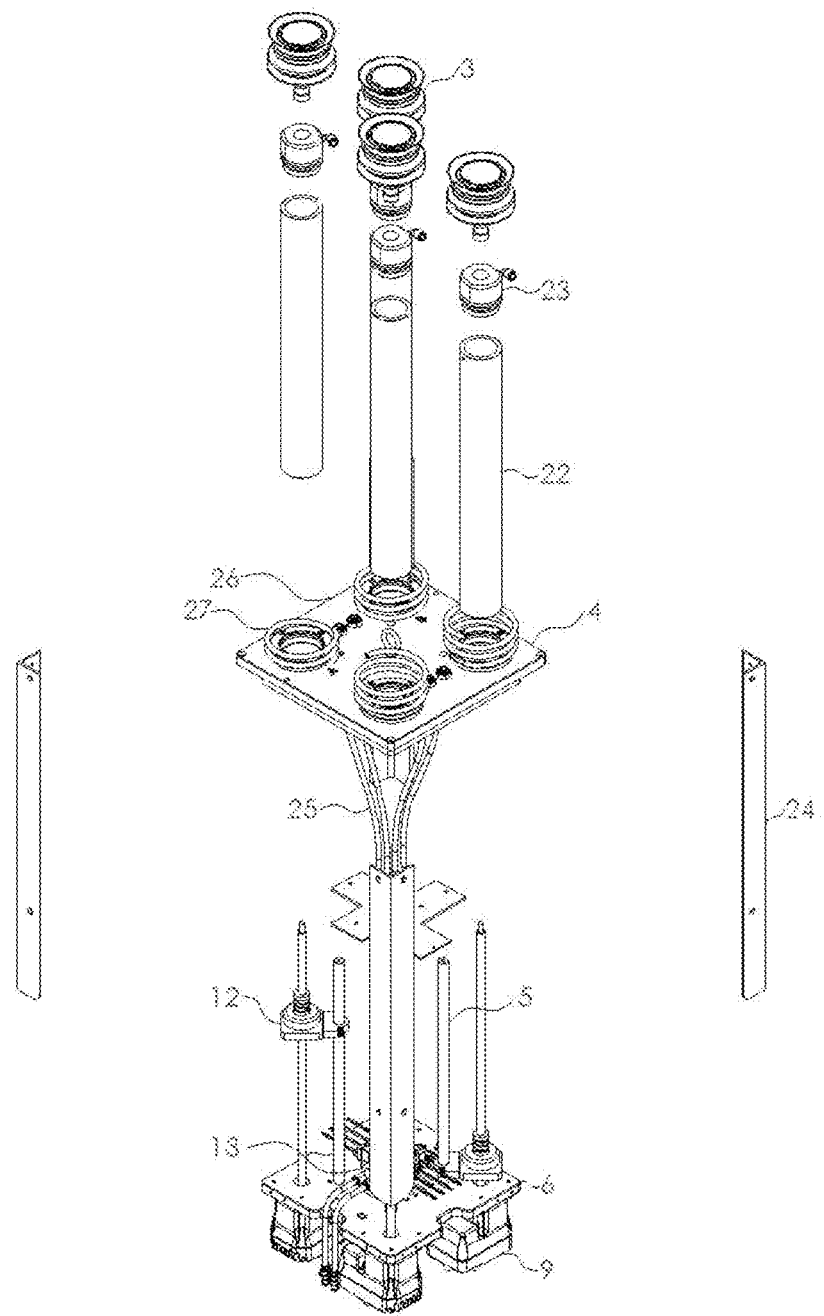
FIG. 6 is an exploded diagram showing certain components of the disassembled pod of FIG. 1 in accordance with one embodiment.
Figure 8:
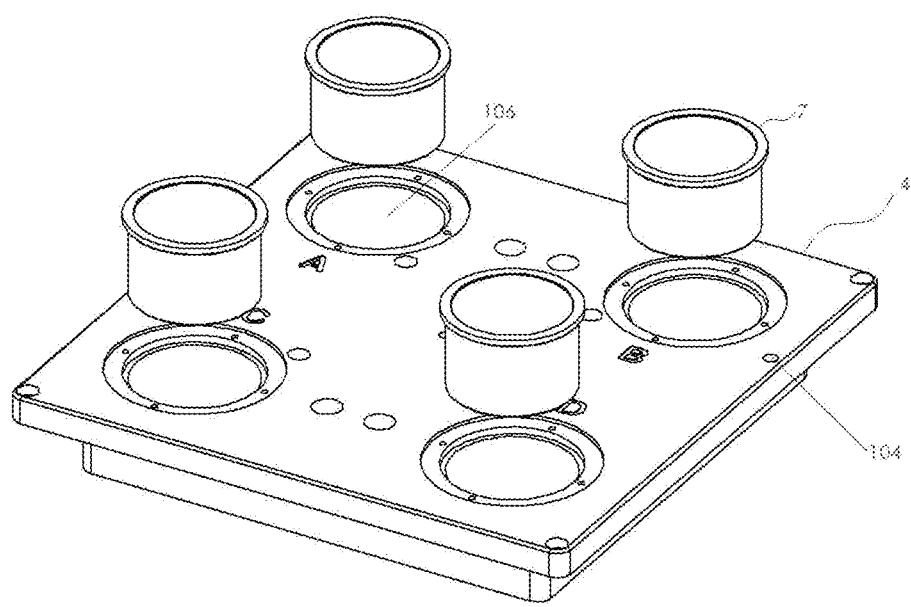
FIG. 8 shows an exploded view of the top plate with the hollow shaft bushings shown vertically above their individual housings in the top plate in accordance with one embodiment.

FIG. 6 is a diagram showing certain components of the disassembled pod 2 of FIG. 1 in accordance with one embodiment. FIGS. 7A-7B are diagrams showing cross-sectional views of the pod 2 of FIG. 1 in accordance with one embodiment. Each pod 2 has a top plate 4 which mounts to the table 1, and suspended from the top plate 4 by rigid structural elements such as tie rods 5 (at least one per pod 2) is a lower plate 6. FIG. 8 shows an exploded view of the top plate 4 with the hollow shaft bushings 7 (also referred to as pass through shaft guides) shown vertically above their individual housings cavities 106 in the top plate 4 in accordance with one embodiment. Each bushing 7 is fit into the corresponding cavity 106 which is precisely located in the top plate 4 and is aligned axially with the Z (upward direction) axis. Also shown is a pin hole 104 for pod alignment to the table 1.

Returning to FIG. 6, each pod 2 further includes a bottom plate 6 that has integrated motors and screw modules 8 mounted to the plate 3, each motor module 8 located precisely below a hollow shaft bushing 7 in the top plate 4. The attached drive screw 10 in the integrated motor and screw module 8 is co-axial to the hollow shaft bushing 7 above the motor module 8.

Figure 9:
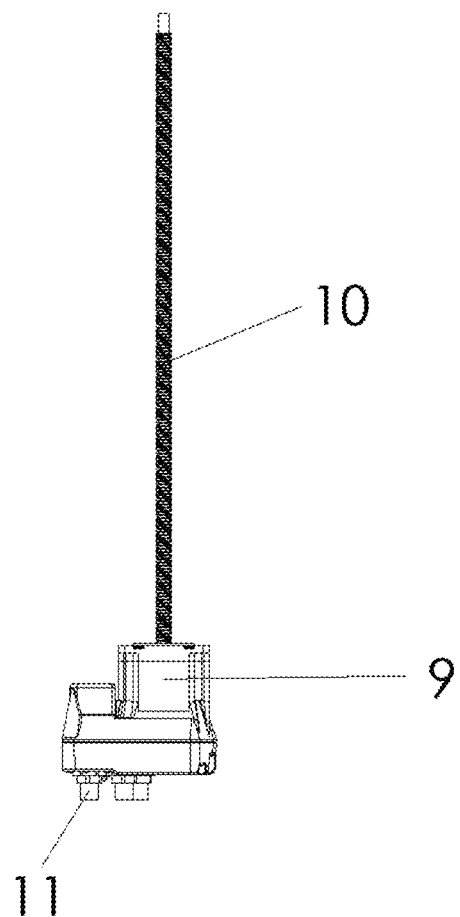
FIG. 9 is a diagram showing the integrated motor and screw module of FIG. 6, which includes an electrical motor with an integral encoder, with a mechanically built in drive screw 10, and integrated input/output ports on the motor in accordance with one embodiment.

FIG. 9 is a diagram showing the integrated motor and screw module 8 of FIG. 6, which includes an electrical motor 9 with an integral encoder (not visible) and motor controller (not visible), with a mechanically built in drive screw 10, and integrated input/output ports 11 on the on the frame of the motor module 8. This module 8 could also be made from separate motor and screw parts. Further, in a further embodiment, the encoder can be physically separate from the motor but interfaced to the motor unit via physical coupling to an output shaft of the motor.

Each integrated motor and screw module 8 has an integrated controller that that receives commands from the HMI and returns data to the HMI. The motor controller uses feedback from the encoder to control the electrical motor so the mechanisms of the pod will move the hollow shaft 22 to the position commanded by the HMI. Data including status and errors is returned to the HMI. In this implementation the electrical motor 9 is a stepper motor with an integral encoder, and integral controls, enabling the motor controller 8 to command the electrical motor 9 to seek a rotary position with a specific encoder count which corresponds to a hollow shaft 22 position. Each motor module 8 has integrated ports 11 for power, communications, and input/output of data signals. The input/output signals can be controlled automatically by the motor controller firmware or controlled by commands to the motor module 8 from an outside system controller 101. In one embodiment, the ports 11 can be located on the motor controller, although other locations are also possible. In one embodiment, the motor module 8 can be a Lexium MDrive® Linear Actuator (NEMA 23 integrated 1.8° 2-phase stepper motor with external shaft) produced by Schneider Electric SE, headquartered in Rueil-Malmaison, France. In a further embodiment, other kinds of motors are also possible. In a still further embodiment, the motor controller could be physically separate from the motor and connected to the motor via a wired or wireless connection. The integrated motor and screw module 8 can be interfaced to three cables (power, communications, and inputs/outputs). The integrated motor and screw module 8 can have connectors compatible with Phoenix Contact SPEEDCOM connection, with the cables interfaced being cables provided by Phoenix Contact of Blomberg, Germany, though other kind of cables are also possible. The connectors can be right angle connectors to reduce the height requirement of the pod 2, though other kinds of connector are also possible. The motor controller being built into the integrated motor and screw module 8 allows for localization of functionality (valves and vacuum sensor mounting to the pod's bottom plate 4) to the integrated motor and screw module 8 rather than distributing components throughout the system or in a system enclosure. This reduces cable lengths and allows the pod 2 to only need one cable for communications and power from the system FIGS. 10A-10B are diagrams showing the integrated motor and screw module 8 of FIG. 6 in combination with certain other components of the pod 2 in accordance with one embodiment. Each drive screw 10 has an anti-backlash nut assembly 12 mounted to the drive screw 10. Each anti-backlash nut assembly 12 also has as a component a floating anti-rotation bushing 14, which fits the tie rod 5 that is mounted adjacent and proximate to the drive screw 10.

FIGS. 11A-11B are diagrams showing the anti-backlash nut assembly 12 of FIGS. 10A-10B when disassembled and assembled in accordance with one embodiment. The anti-backlash assembly (also referred to as anti-rotation linear guide) includes a lead nut 16, connected to a nut adaptor 15. Also attached to the nut adaptor 15 is a floating anti-rotation bushing 14, which is attached to the nut adaptor 15 by a pair of parallel shoulder bolts 17. This mounting permits the floating anti-rotation bushing 14 to be pushed toward and away from the center of the lead nut 16 while maintaining a fixed angular relationship between the two parts.

Returning to FIGS. 10A-10B, when the electric motor 9 rotates the drive screw 10 the lead nut 16 maintains fixed orientation due to the bushing 14 of the nut assembly 12, and the lead nut 16 is pushed to move itself up and down the tie rod 5.

Also attached to the bottom plate 6, is a pneumatic manifold 13.

Figure 12A:
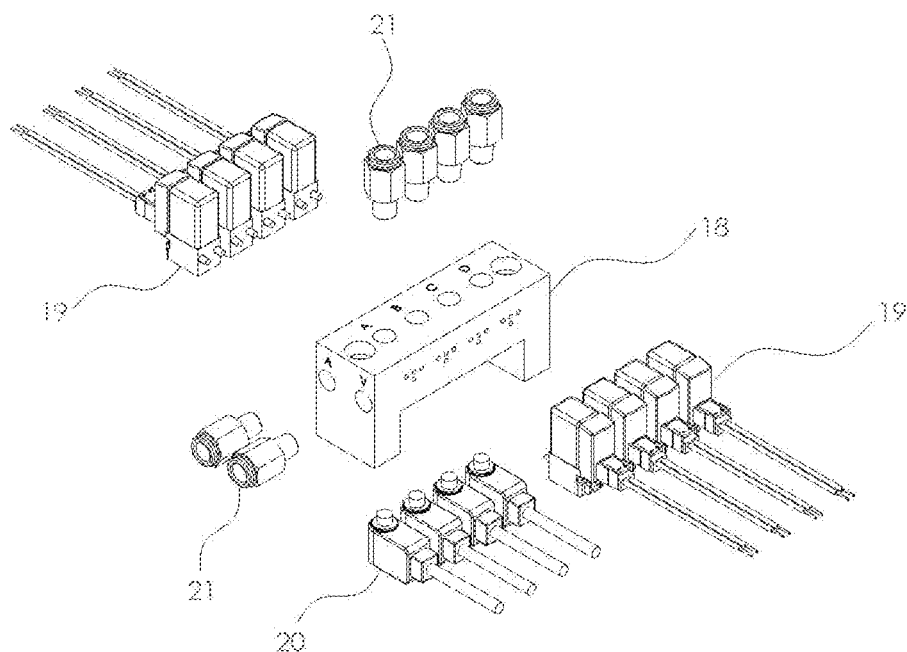
FIG. 12A-12C show several views of the pneumatic manifold assembly of FIG. 10 in accordance with one embodiment.
Figure 12B:
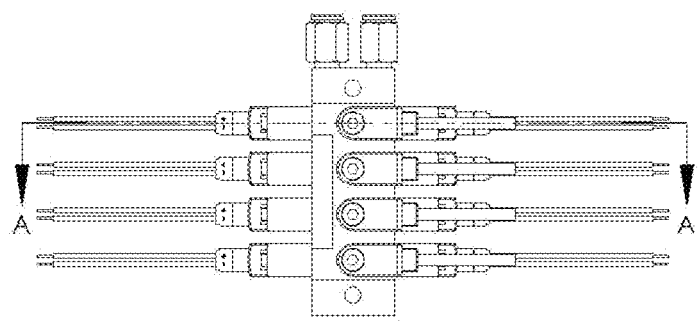
Figure 12C:
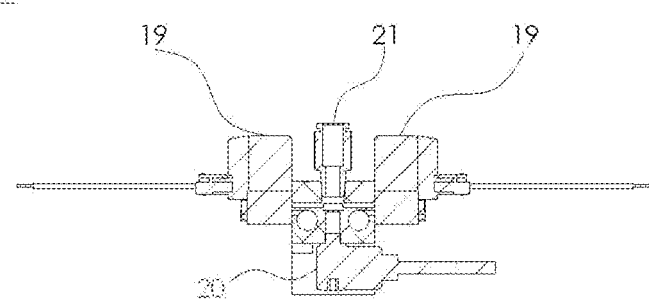

FIGS. 12A-12C are diagrams showing several views of the pneumatic manifold 13 subassembly of FIGS. 10A-10B in accordance with one embodiment. Each pod 2, has a single manifold block 18, which connects via air fittings 21 to air and vacuum supplies. The manifold block 18 has attached pairs of valves 19, each pair controlled by output signals from the control ports 11 on motor module 8. For each pair, one of these valves 19 connects the air supply with an output air fitting 21 and the other valve 19 connects the vacuum supply to the same air fitting 21 which eventually connects to the end effector 3 that is coaxial to the motor module 8 supplying the output signals from ports 11 for the valve 19 pair. Additionally, a vacuum sensor 20 is connected to the joint output of the valves to monitor the pressure for the end effector 3 vacuum level against a part held. The monitored pressure can be provided by the sensor 20 as a signal to one of the data ports 11 on the motor controller of the motor module 8 coaxial to the end effector whose pressure level is being monitored. In one embodiment, the sensor 20 can report if the pressure falls under a certain threshold or not. In a further embodiment, the sensor 20 can regularly report the pressure level. The motor controller in turn can provide the pressure data to the HMI via the network communication connection. The HMI can signal can signal an operator to notify them of the existence of a malfunction or improper setup of the end effector that results in the wrong vacuum pressure.

Returning to FIG. 6 also attached to the nut adaptor 15 of the anti-backlash nut assembly 12 is a hollow shaft 22 that is co-axial to the drive screw 10, and passes through the hollow shaft bushing 7 mounted in the top plate 4 with minimal clearance. This hollow shaft 22 encapsulates the part of the drive screw 10 that is above the anti-backlash nut assembly 12, and in all lead nut 12 positions, the hollow shaft 22 extends beyond the top plate 4.

Attached to the top of this hollow shaft 22 is an end effector adaptor 23 that holds tooling elements 3, such as end effectors 3, with an end effector 3 including a precisely positioned spherical pivot that links to combination of a locating surface and a vacuum cup which holds parts to that locating surface. In a further embodiment, instead of an end effector 23 adaptors, a cap (not shown) on which tooling elements can be constructed can be attached to an end of the hollow shaft 22 to which the end effector adaptor 3 otherwise attaches.

Figure 13:
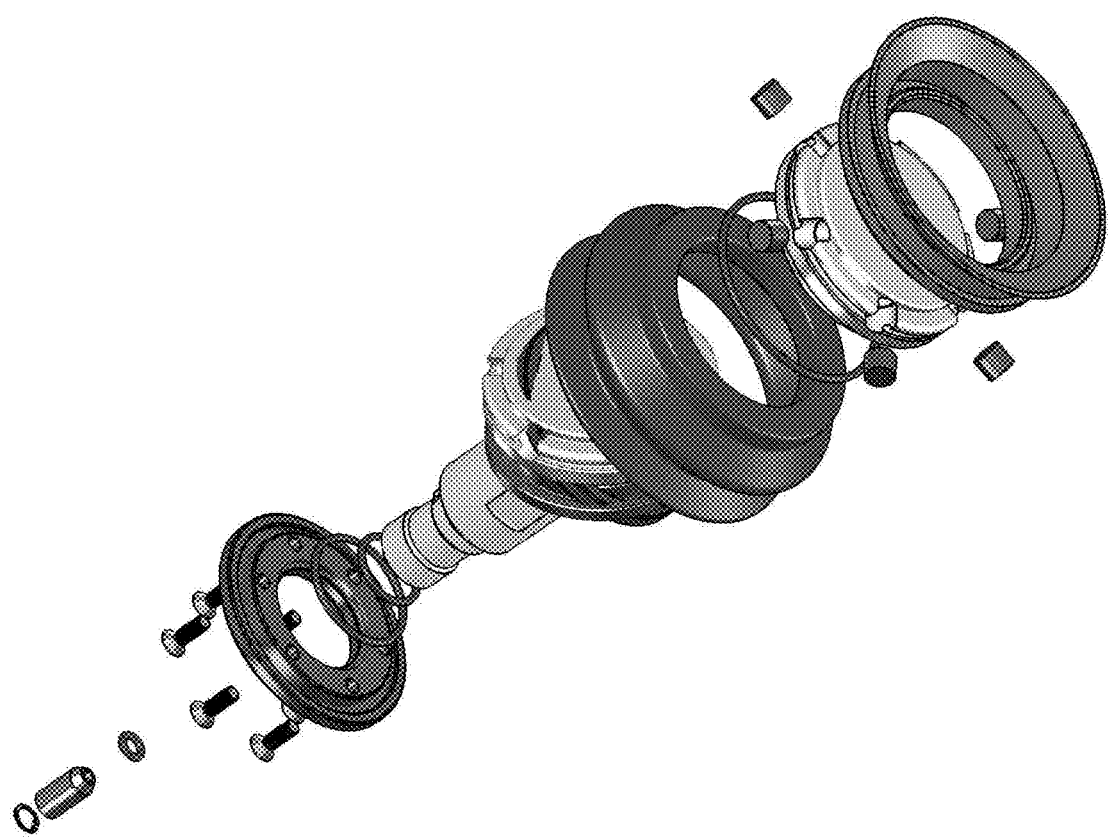
FIG. 13 shows a view of an end effector of FIG. 1 when disassembled in accordance with one embodiment.
Figure 14A:
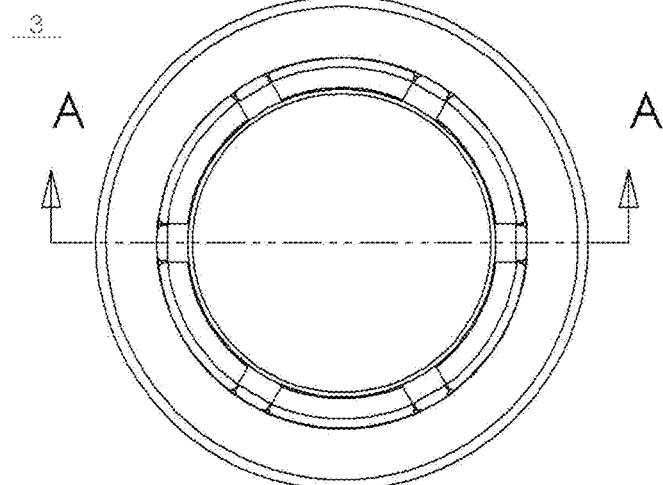
FIG. 14A shows a schematic top view of an end effector of FIG. 1 in accordance with one embodiment.
Figure 14C:
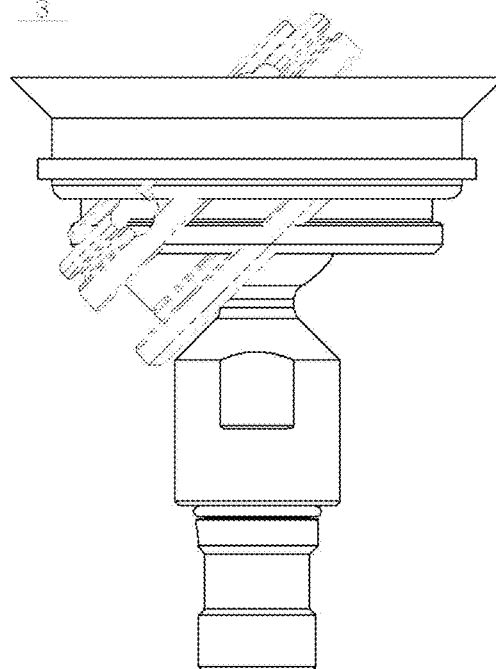
FIG. 14C show, by way of example, a schematic side view of an end effector of FIG. 1 in accordance with one embodiment.
Figure 14B:
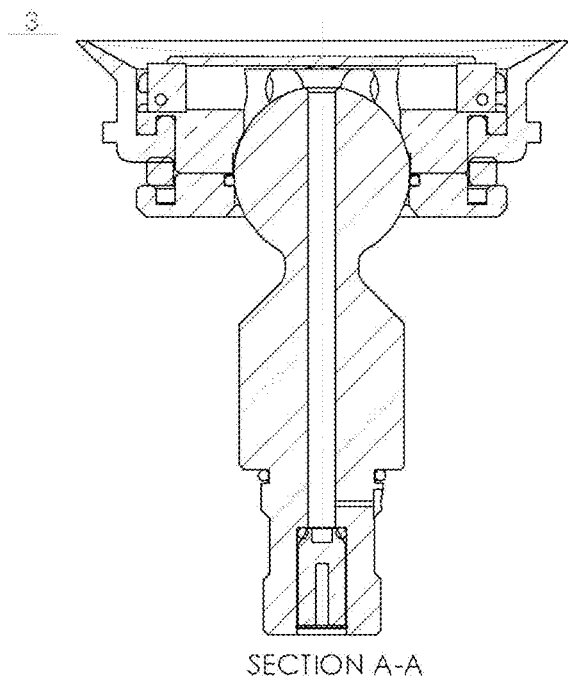
FIG. 14B shows a schematic cross-sectional view of an end effector of FIG. 1 in accordance with one embodiment.

FIGS. 13 and 14A-C are manufacturing assembly drawings of an end effector 3 in accordance with one embodiment and illustrate the features referred to in the above description. FIG. 13 shows a view of an end effector of FIG. 1 when disassembled in accordance with one embodiment. FIG. 14A shows a schematic top view of an end effector 3 of FIG. 1 in accordance with one embodiment. FIG. 14B shows a schematic cross-sectional view of an end effector 3 of FIG. 1 in accordance with one embodiment. FIG. 14C shows, by way of example, a schematic side view of an end effector 3 of FIG. 1 in accordance with one embodiment.

Returning to FIG. 6, when loads are applied to an End Effector 3, this loads the hollow shaft 22 via the end effector adaptor 23. The hollow shaft bushing 7 in the top plate 4 support the hollow shaft 22 against lateral loads, and the axial loads go through the hollow shaft 22 to the bottom and into the anti-backlash nut assembly 12, into the lead nut 16, and down the lower segment of the screw 10 (at and below the nut 16), to the motors modules 8 mounted on the lower plate 6. This then loads the tie rods 5, and pulls on the upper plate 4 via those tie rods 5.

Corner guards 24 are attached to the underside of the upper plate 4 and continue to the corners of the lower plate 6 that is slightly smaller than the holes of the table 1 that the pod 2 is lowered into to prevent damage to the actuation mechanisms.

Attached to the pneumatic manifold 13 is one internal pneumatic tube 25 for each supported end effector 3. Each internal pneumatic tube 25 also connects to a bulkhead pneumatic fitting 26 that penetrates the top plate 4. Also attached to this bulkhead pneumatic fitting 26 is an external pneumatic tube 27, which also connects to the end effector adaptor 23 that is co-axial with the motor module 8 that supplied the output switch signals for that valve 19 pair. This air and vacuum supply is used to control the suction status of the vacuum cup of the mounted end effector 3.

As mentioned above, FIGS. 7A-7B show a cross section of the assembled pod 2, which shows the co-axial nature of the hollow shafts 22, hollow shaft bushing 7 and drive screw 10. Additionally, FIGS. 7A-7B show the position of the cable adapter board 29 mounted on the lower plate 6. All of the cables within a pod 2 (sensor, valve, and motor), as well as the main combined power/control cable are attached to the board 29, which allows reduction of the count and lengths of cables and simplifies connections between the motor modules 8, valves 19, vacuum sensors 20, and main pod cable. Since the power and communications to the pod 2 is shared by all the motors 9 and other components in the pod 2, the board 29 allows for one main pod cable to be used to connect to the system instead of multiple ones for each motor 9 in the pod. In one embodiment, there are 12 motor cables (there are four motors modules 8 to a pod and each motor module 8 has three cables), eight valve cables (one for air and one for vacuum for each motor module 8), four vacuum sensor cables, and one main pod cable (power and communications) for a total of 25 cables per pod 2, though other numbers of cables are possible in a further embodiment. The cable adapter board 29 takes care of the signal routing for all these cables. The board 29 eliminates the need for terminal blocks and reduces the number of individual wires needed. The cable adapter board 29 also reduces the chance of error inherent in hand wiring.

While the invention has been particularly shown and described as referenced to the embodiments thereof, those skilled in the art will understand that the foregoing and other changes in form and detail may be made therein without departing from the spirit and scope of the invention.

What is claimed is:

1. A vacuum-and-air-supplying pneumatic manifold-based flexible tooling system, comprising:
   one or more pods attached to a table frame, each of the pods comprising:
      a top plate shaped to attach to the table frame, the top plate comprising one or more pass through shaft guides;
      a lower plate;
      a plurality of structural elements connecting the top plate to the lower plate; and
      one or more integrated motor and screw modules connected to the lower plate, each comprising:
         a motor co-axial with one of the pass through shaft guides;
         an encoder configured to detect the motor being in one of a plurality of positions;
         a motor controller configured to command the motor to take one of the positions using feedback from the encoder;
         a drive screw mechanically coupled to an output of the motor, wherein the drive screw is moved upon the motor moving from one of the positions to another one of the positions;
         an anti-rotation linear guide comprising a nut element that mounts onto the drive screw and a linear guide element that is attached to the nut element and that prevents rotation of the nut element, wherein the movement of the drive screw causes a linear motion of the nut element along a length of the drive screw; and
         a hollow shaft mounted onto the nut element, the hollow shaft extending through one of the pass through shaft guides and configured to connect to a tooling element comprising an end effector configured to hold a load;
      a pneumatic manifold which provides air and vacuum to the end effectors, wherein the vacuum is used to secure the load to the end effectors, and the air is used to release the load from the end effectors, and wherein the pneumatic manifold is controlled in providing the air and the vacuum to one or more of the end effectors by one or more manifold controllers comprised in that pod, the pneumatic manifold further comprising:
         a manifold block;
         air fittings connecting the manifold block to a supply of the air and a supply of the vacuum; and
         a plurality of pairs of valves attached to the manifold block, wherein flow of the vacuum or the air through a plurality of exit pneumatic ports of the manifold block is controlled by the pairs of the valves; and
      one or more internal pneumatic tubes, each connected as part of a path from the pneumatic manifold to one of the end effectors, wherein both the air and the vacuum are supplied to each end effector via the internal pneumatic tube different from the internal pneumatic tubes supplying the remaining end effectors and under the control of the manifold controller that is comprised in that pod and that is associated with that end effector.

2. A system according to claim 1, wherein the pneumatic manifold is attached to the lower plate.

3. A system according to claim 1, wherein the manifold controller associated with each end effector comprises the motor controller commanding the motor coaxial with that end effector.

4. A system according to claim 1, wherein at least one of the end effectors comprises a spherical pivot connected to a locating surface and a vacuum cup which holds the load to that locating surface.

5. A system according to claim 1, further comprising:
   one or more bushings insertable within the top plate, each shaped to support one of the hollow shafts against lateral loads.

6. A system according to claim 1, wherein at least some of the structural elements are tie rods.

7. A system according to claim 1, each of the pods further comprising:
   a plurality of guards, each attached to the top plate and to the lower plate.

8. A system according to claim 1, the pods further comprising:
a plurality of locating pin alignment holes formed in the top plate via which the top plate is aligned to the table frame.

9. A system according to claim 1, the system further comprising:
a human-machine interface comprising a system controller, a user interface, power source from which each pod is powered, and a communication system connecting the system controller with each motor.

10. A system according to claim 9, wherein each of the motor controllers are associated with a network address and that motor controller commands the motor further using a command received by the motor controller at that network address from the human-machine interface.

11. A system according to claim 9, wherein the motor controllers provide data comprising status and errors to the human-machine interface.

12. A system according to claim 9, wherein the power source comprises one or more of a generator, a stored power source, and an electrical outlet.

13. A system according to claim 9, at least one of the pods further comprising:
a cable adapter board, wherein all of the cables within the pod connect to the cable adapter board.

14. A system according to claim 13, wherein the cable adapter board is mounted to the lower plate of that pod.

15. A system according to claim 13, wherein a cable from the human-machine interface attached to the cable adapter board.

16. A system according to claim 9, the system further comprising:
a plurality of vacuum sensors, each connected to a joint output of one of the pairs of valves and configured to monitor pressure for the tooling element coaxial to the motor whose controller is connected to the valves and to provide data regarding the monitored pressure to a data input port on that motor controller, wherein the motor controller provides at least some of the pressure data to the human machine interface.

17. A system according to claim 16, the human-machine interface configured to provide a signal to an operator based on the pressure data.

18. A system according to claim 16, wherein the sensors provide the pressure data to the controllers upon the pressure sensed by those sensors fall below a threshold.

19. A system according to claim 16, wherein the sensors regularly provide the pressure data to the controllers.

20. A pneumatic manifold-based flexible tooling system, comprising:
one or more pods attached to a table frame, each of the pods comprising:
a top plate shaped to attach to the table frame, the top plate comprising one or more pass through shaft guides;
a lower plate;
a plurality of structural elements connecting the top plate to the lower plate; and
one or more integrated motor and screw modules connected to the lower plate, each comprising:
a motor co-axial with one of the pass through shaft guides;
an encoder configured to detect the motor being in one of a plurality of positions;
a motor controller configured to command the motor to take one of the positions using feedback from the encoder;
a drive screw mechanically coupled to an output of the motor, wherein the drive screw is moved upon the motor moving from one of the positions to another one of the positions;
an anti-rotation linear guide comprising a nut element that mounts onto the drive screw and a linear guide element that is attached to the nut element and that prevents rotation of the nut element, wherein the movement of the drive screw causes a linear motion of the nut element along a length of the drive screw; and
a hollow shaft mounted onto the nut element, the hollow shaft extending through one of the pass through shaft guides and configured to connect to a tooling element comprising an end effector configured to hold a load;
a pneumatic manifold which provides air and vacuum to the end effectors, wherein the vacuum is used to secure the load to the end effectors, and the air is used to release the load from the end effectors, the pneumatic manifold further comprising:
a manifold block;
air fittings connecting the manifold block to a supply of the air and a supply of the vacuum; and
a plurality of pairs of valves attached to the manifold block, wherein flow of the vacuum or the air through a plurality of exit pneumatic ports of the manifold block is controlled by the pairs of the valves;
at least one internal pneumatic tube connected to the pneumatic manifold and to a bulkhead pneumatic fitting; and
at least one external pneumatic tube attached to the bulkhead pneumatic fitting and to an adaptor that holds one of the end effectors, wherein the bulkhead pneumatic fitting penetrates the top plate.

* * * * *